Figures 1, 2, 3, 4:
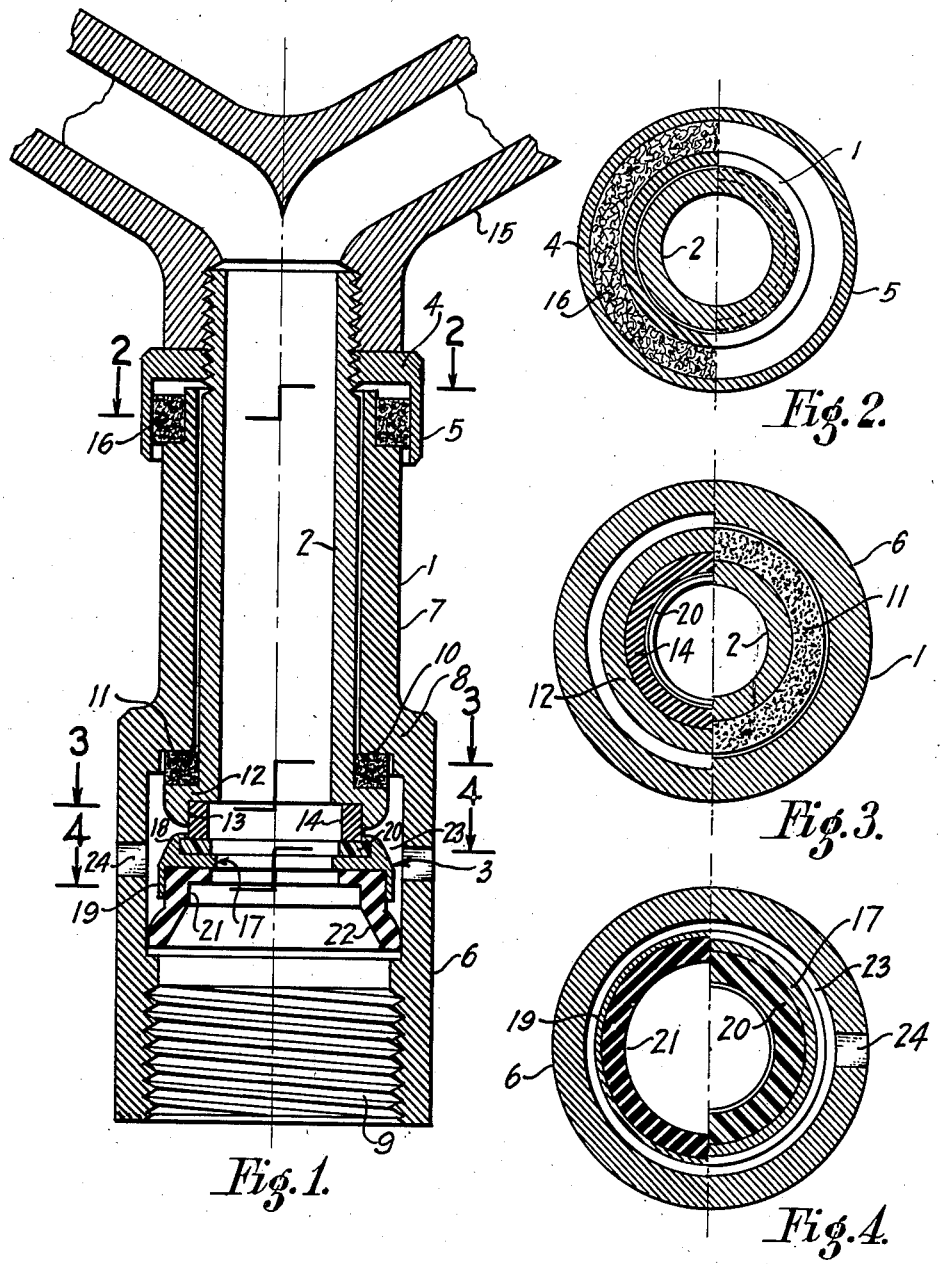

June 25, 1957  J. A. ROYER  2,797,108

SAND ELIMINATOR BEARING FOR A SPRINKLER HEAD

Filed Sept. 14, 1953

INVENTOR.
John A. Royer
BY
A. Schapp
ATTORNEY

United States Patent Office 2,797,108
Patented June 25, 1957

2,797,108

SAND ELIMINATOR BEARING FOR A SPRINKLER HEAD

John A. Royer, Fresno, Calif., assignor to Buckner Manufacturing Company, Inc., Fresno, Calif., a corporation of California Application September 14, 1953, Serial No. 380,067

3 Claims. (Cl. 285—14)

The present invention relates to improvements in a sand eliminator bearing for a sprinkler head, and contemplates certain further developments in a device of similar nature disclosed in the application of John B. Gill, Serial Number 331,015, filed January 13, 1953, now Patent No. 2,733,080, issued January 31, 1956.

The principal object of the invention is to provide a bearing of the character described in which sand and foreign matter are prevented from entering between the bearing surfaces of a fixed housing and a rotary spindle carrying the sprinkler head.

In prior systems it has been customary to allow for a certain amount of leakage through the bearings and to cause the leakage to serve as a lubricant for the bearings. It appears, however, that the leakage always carries a certain amount of sand, silt, and other foreign matter which tends to abrade the bearing surfaces and to shorten the life of the bearings.

In the Gill application, it was proposed to provide a bearing structure employing anti-friction bearings which do not depend upon a lubricant for successful operation, to reduce the leakage about the spindle to minimum, and to divert the leakage into the atmosphere before it reaches the bearings.

In the present invention it is proposed to provide a special seal to further reduce leakage about the spindle and to more effectively use the pressure of the water for tightening the seal.

It is further proposed to provide certain improvements in means for locking the sprinkler head to the spindle and in means associated therewith for protecting the top of the spindle bearing housing to prevent entry of dust and dirt into the bearing from the top.

Further objects and advantages of my invention will appear as the specification proceeds, and the new and useful features of my improvements will be fully defined in the claims hereto appended.

The preferred form of my invention is illustrated in the accompanying drawing, forming part of this application, in which:

Figure 1 shows a vertical section through my sprinkler head bearing;

Figure 2, a section taken along line 2—2 of Figure 1;

Figure 3, a section taken along line 3—3 of Figure 1; and

Figure 4, a section taken along line 4—4 of Figure 1.

While I have shown only the preferred form of the invention, it should be understood that various changes or modifications may be made within the scope of the claims attached hereto, without departing from the spirit of the invention.

Referring to the drawing in detail, my invention comprises, in its principal features, a bearing housing 1, a spindle 2 revolvable therein, a sealing assembly 3 supporting the spindle, and a lock nut 4 for the sprinkler head formed with a protective shield 5 for the upper end of the bearing housing.

The housing 1 is cylindrical in form, is preferably made of brass and comprises a lower section 6 of relatively large diameter and an upper section 7 of a smaller diameter, the two sections forming a shoulder 8 intermediate the length of the housing.

The lower end of the lower section is threaded, as at 9, for engagement over a suitable riser (not shown). The shoulder 8 is formed with an inner ledge 10 for accommodating a washer 11, which is preferably made of a graphite composition.

The spindle 2 is preferably constructed of brass, and is revolvable in the upper section 7 of the housing and has a lower end extending a short distance into the lower section, with a flange 12 bearing against the washer 11 from below.

The lower end of the spindle is recessed, as at 13, and has a spindle sleeve 14 fit into the recess with a pressed fit, the sleeve being made of stainless steel and projecting below the spindle to form the main bearing face for the latter.

The upper end of the spindle 2 projects above the housing and is threaded to receive the sprinkler head 15 thereon. The lock nut 4 is screwed on the spindle below the sprinkler head and firmly locks the latter when screwed tightly up against the same. It is formed with a depending annular shield 5 which projects downwardly below the upper edge of the bearing housing to form an umbrella and to protect the main bearing between the housing and the spindle from above.

A felt washer 16 is interposed between the upper end of the housing and the shield to prevent dust and dirt from blowing into the minute opening between the spindle and the housing.

The spindle, through its sleeve 14, rides and revolves on the sealing assembly 3 which includes a flange cup 17, preferably constructed of brass, and having an upper annular rim 18 and a lower annular rim 19. A spindle seal washer 20 is carried by the upper face of the flange cup and is confined by its upper rim 19, which is preferably turned inwardly, as shown, to project over the rim of the washer and to leave an opening sufficient for the spindle sleeve 14 to rotate therein. This washer 20 is preferably made of plastic or other anti-friction material so as to offer little resistance to the rotation of the spindle.

The lower rim 19 of the flange cup accommodates a rubber washer 21 which projects downwardly below the rim and has a flange or apron 22 made to spread outwardly into contact with the housing wall.

When water under pressure passes through the spindle, it expands the flange 22 against the bearing housing, thus forming a tight seal, and it also exerts upward pressure on the entire sealing assembly 3, urging the spindle seal washer 20 into close contact with the spindle sleeve 14 so as to eliminate leakage at that point.

The sealing assembly is dimensioned with respect to the surrounding bearing housing to leave a clear annular space 23 about the sealing assembly. This space is vented to the atmosphere by one or more ports 24, so that the building up of a counter-pressure on the outside of the sealing assembly is effectively prevented.

The ports also serve as outlets for any slight leakage that may pass the washer 22 or escape between the bearing faces of members 14—20, so that any foreign matter carried by the leakage is immediately removed from the system.

In operation, as the water is admitted into the spindle under pressure, it enters the sprinkler head and causes the latter to rotate. At the same time the water exerts upward pressure on the sealing assembly 3 so as to press the spindle seal washer 20 against the spindle sleeve 14 which rotates on the washer. Furthermore the water exerts outward pressure on the flange 22 so as to form a tight seal against the bearing housing.

The ports 24 prevent any outside pressure from building up around the sealing assembly and at the same time allow any leakage to discharge into the atmosphere without entering the bearing system. The washer 11 seals the main bearing surfaces against the annular space 23.

The lock nut 4 locks the sprinkler head to the spindle and at the same time serves as an umbrella for the upper end of the bearing, with the felt washer 16 serving to prevent dust and dirt from blowing into the minute space between the spindle and the bearing housing.

While I have mentioned special materials for the various parts of the assembly as being particularly adapted for their respective purposes, I do not wish to be limited to these materials. Any other materials of similar characteristics may be substituted.

The spindle sleeve 14, for instance, may be made of other material than stainless steel. Likewise, the spindle seal washer 20 may be made of metal as well as of plastic material. The flange cup 17 and flange washer 21 may at some time in the future, be made entirely of plastic, or they may be made entirely of rubber designed in such a way as to hold the sealing washer without the necessity of the metal flange cup.

I claim:

1. In a device of the character described, a sealing and bearing assembly for a vertically mounted, rotary spindle, comprising a flange cup having upper and lower annular rims, a sealing washer mounted in the upper rim and having a flat upper surface of anti-friction material, and a flange washer mounted in the lower rim and having an expanded annular apron suspended therefrom, the upper rim having its upper edge bent over the rim of the sealing washer to define an annular opening adapted for confining the lower end of a spindle-supporting sleeve therein.

2. In a device of the character described, a sealing and bearing assembly for a vertically mounted, rotary spindle, comprising a flange cup having upper and lower annular rims, a sealing washer mounted in the upper rim and having a flat upper surface of anti-friction material, and a flange washer mounted in the lower rim and having an expanded annular apron suspended therefrom, the upper rim having its upper edge bent over the rim of the sealing washer to define an annular opening adapted for confining the lower end of a spindle-supporting sleeve therein, and a cylindrical housing for the sealing and bearing assembly and for the spindle and adapted for connection to a source of water under pressure whereby water may be forced through the assembly and the spindle from below, the apron being adapted for sealing contact with the housing.

3. In a device of the character described, a sealing and bearing assembly for a vertically mounted, rotary spindle, comprising a flange cup having upper and lower annular rims, a sealing washer mounted in the upper rim and having a flat upper surface of anti-friction material, and a flange washer mounted in the lower rim and having an expanded annular apron suspended therefrom, the upper rim having its upper edge bent over the rim of the sealing washer to define an annular opening adapted for confining the lower end of a spindle-supporting sleeve therein, and a cylindrical housing for the sealing and bearing assembly and for the spindle and adapted for connection to a source of water under pressure whereby water may be forced through the assembly and the spindle from below, the apron being adapted for sealing contact with the housing, the sealing assembly having clearance with the housing above the apron to provide an annular chamber for receiving water leaking past the apron, and the housing having a port opposite the assembly to allow the leakage to escape to the outside.

References Cited in the file of this patent

UNITED STATES PATENTS

| | | |
|---|---|---|
| Re. 18,296 | Pierce | Dec. 22, 1931 |
| 830,392 | Wiedeman | Sept. 4, 1906 |
| 1,564,270 | Phillips | Dec. 8, 1925 |
| 1,621,980 | Goodman | Mar. 22, 1927 |
| 1,996,899 | Buckner | Apr. 9, 1935 |
| 2,075,336 | Buckner | Mar. 30, 1937 |
| 2,185,822 | Young | Jan. 2, 1940 |
| 2,733,080 | Gill | Jan. 31, 1956 |

FOREIGN PATENTS

| | | |
|---|---|---|
| 211,185 | Great Britain | Feb. 13, 1924 |
| 436,224 | Germany | Oct. 28, 1926 |
| 830,586 | France | May 16, 1938 |